United States Patent
Hasegawa et al.

(10) Patent No.: US 10,578,826 B2
(45) Date of Patent: Mar. 3, 2020

(54) LENS BARREL AND METHOD FOR OPTICAL AXIS ADJUSTMENT

(71) Applicant: Panasonic Intellectual Property Management Co., Ltd., Osaka (JP)

(72) Inventors: Atsushi Hasegawa, Osaka (JP); Kenji Ikeo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 182 days.

(21) Appl. No.: 15/678,690

(22) Filed: Aug. 16, 2017

(65) Prior Publication Data
US 2017/0343763 A1 Nov. 30, 2017

Related U.S. Application Data

(63) Continuation of application No. PCT/JP2016/001246, filed on Mar. 8, 2016.

(30) Foreign Application Priority Data

Mar. 9, 2015 (JP) .................................. 2015-046065

(51) Int. Cl.
*G02B 9/12* (2006.01)
*G02B 9/00* (2006.01)
(Continued)

(52) U.S. Cl.
CPC ............. *G02B 7/021* (2013.01); *G02B 7/023* (2013.01); *G02B 7/025* (2013.01); *G02B 15/15* (2013.01)

(58) Field of Classification Search
CPC .... G02B 13/0035; G02B 13/24; G02B 7/021; G02B 7/02; G02B 7/023; G02B 7/04;
(Continued)

(56) References Cited

U.S. PATENT DOCUMENTS 8,879,176 B2 11/2014 Ouichi
2016/0349478 A1* 12/2016 Shirono .................. G02B 7/021

FOREIGN PATENT DOCUMENTS

JP 10-160993 A 6/1998
JP 2006-349950 A 12/2006
(Continued)

OTHER PUBLICATIONS

International Search Report for PCT/JP2016/001246, dated Apr. 19, 2016 (with English translation).

*Primary Examiner* — Dawayne Pinkney
(74) *Attorney, Agent, or Firm* — Renner, Otto, Boisselle & Sklar, LLP

(57) ABSTRACT

Lens barrel includes first group lens frame unit, second group lens frame unit, lens frame, insertion hole, and depressions. First group lens frame unit holds lenses. Second group lens frame unit holds lens. Lens frame is disposed between first group lens frame unit and second group lens frame unit on an inner circumference side of first group lens frame unit through radial clearance. Insertion hole is provided on an outer peripheral surface of first group lens frame unit, and a jig of lens frame is inserted into insertion hole. Depressions are provided at a position accessible from an outside in a state where first group, second group lens frame units and lens frame are assembled, and fix lens frame to first group lens frame unit.

12 Claims, 7 Drawing Sheets

(51) Int. Cl.
*G02B 7/02* (2006.01)
*G02B 15/15* (2006.01)

(58) Field of Classification Search
CPC ........ G02B 7/08; G02B 7/026; G11B 7/0932;
G03B 17/14
USPC .................................. 359/784, 754, 811–830
See application file for complete search history.

(56) References Cited

FOREIGN PATENT DOCUMENTS

JP          2013-171272  A     9/2013
WO     WO 2012/128202  A1    9/2012

\* cited by examiner

LENS BARREL AND METHOD FOR OPTICAL AXIS ADJUSTMENT

TECHNICAL FIELD

The present disclosure relates to a lens barrel including a plurality of lens frames disposed in an optical axis direction and a method for optical axis adjustment.

BACKGROUND ART

A lens barrel includes lens groups respectively attached to a plurality of lens frames in an optical axis direction.

For example, PTL 1 discloses a lens adjusting mechanism facilitating adjustment of the optical axes (eccentricity adjustment) of lenses between two lens holding members (lens frames) coupled with each other.

CITATION LIST

Patent Literature

PTL1: Unexamined Japanese Patent Publication No. 10-160993

SUMMARY OF THE INVENTION

The above conventional lens barrel has a problem as described below.

The lens barrel disclosed in PTL 1 is capable of eccentricity adjustment between two lens holding members, but is not applicable as it is to eccentricity adjustment of inner lens frames among a plurality of lens frames.

An object of the present disclosure is to provide a lens barrel and a method for optical axis adjustment capable of facilitating eccentricity adjustment of lenses attached to inner lens frames among a plurality of lens frames disposed in the lens barrel in an optical axis direction.

A lens barrel according to the present disclosure includes a plurality of lenses disposed in an optical axis direction, and includes a cylindrical first lens frame, a second lens frame, a third lens frame, an insertion hole, and a joint. The cylindrical first lens frame holds a first lens disposed on a subject side. The second lens frame holds a second lens disposed on a side opposite to the subject side in the first lens frame in the optical axis direction. The third lens frame is disposed between the first lens frame and the second lens frame and on an inner circumference side of the first lens frame through a radial clearance, and holds a third lens. The insertion hole is at least one through hole provided on an outer peripheral surface of the first lens frame, and a jig for eccentricity adjustment of the third lens frame is inserted into the insertion hole. The joint is provided at a position accessible from an outside in a state where the first to third lens frames are assembled, and fixes the third lens frame to the first lens frame. The joint is provided on at least one of the first lens frame and the third lens frame.

A method for optical axis adjustment according to the present disclosure is to adjust an optical axis of a lens barrel including a first lens, a second lens, and a third lens disposed in an optical axis direction, a first lens frame having a cylindrical shape and holding the first lens, a second lens frame holding the second lens, and a third lens frame holding the third lens. The method includes a step of assembling the first to third lens frames in such a manner that the third lens frame is disposed between the first lens frame and the second lens frame and on an inner circumference side of the first lens frame through a radial clearance. The method further includes, after the assembling step, a step of inserting a jig from at least one insertion hole provided on an outer peripheral surface of the first lens frame to perform eccentricity adjustment of the third lens frame. The method further includes, after the step of the eccentricity adjustment, a step of fixing the third lens frame to the first lens frame with the joint that is provided on at least one of the first lens frame and the third lens frame and is accessible from an outside of the first lens frame in a state where the first to the third lens frames are assembled.

The lens barrel and the method for optical axis adjustment according to the present disclosure enable facilitating eccentricity adjustment of the lenses attached to inner lens frames among the plurality of lens frames in a lens barrel in which the plurality of lens frames are disposed in the optical axis direction.

DESCRIPTION OF EMBODIMENT

An exemplary embodiment will be described below with reference to the drawings, as appropriate. A description may not be given in more detail than necessary. For example, matters that have been already well known may not be described in detail or the description of substantially the same configuration may not be repeated. This is to avoid unnecessary redundancy of the following description and facilitate the understanding of one skilled in the art.

Here, the applicant provides the attached drawings and the following description such that one skilled in the art can sufficiently understand the present disclosure, and therefore, they do not intend to restrict the subject matters of claims.

First Exemplary Embodiment

Lens barrel 10 according to one exemplary embodiment of the present disclosure is described below with reference to FIGS. 1 to 7.

<General Configuration of Lens Barrel 10>

Figure 1:
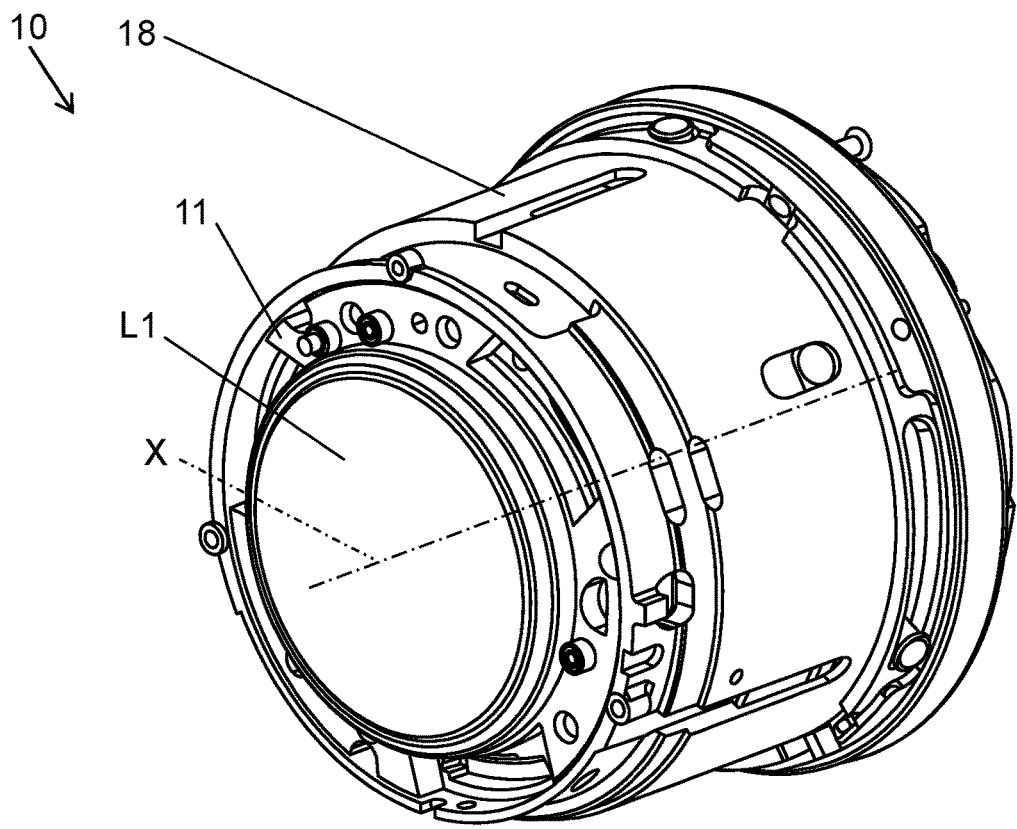
FIG. 1 is a perspective view of an overall lens barrel according to an exemplary embodiment of the present disclosure.
Figure 2:
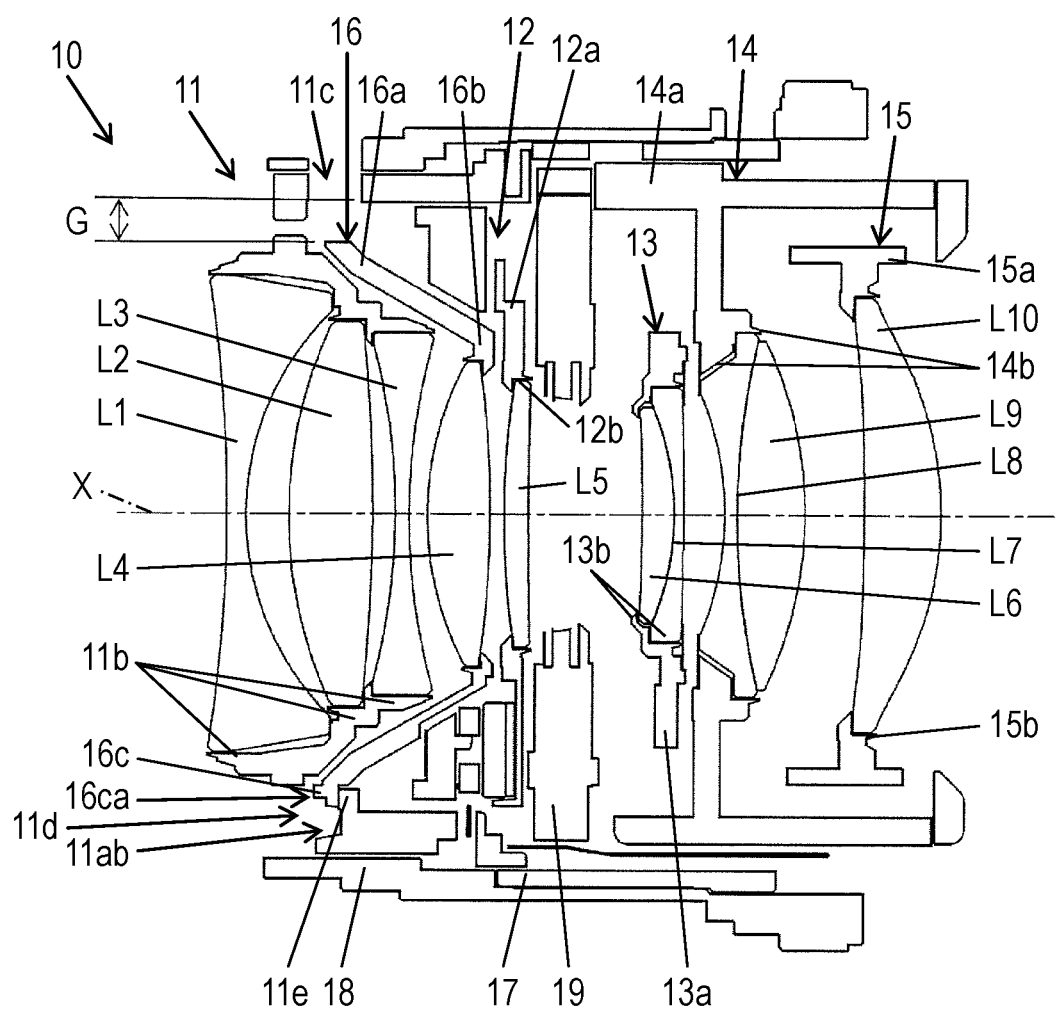
FIG. 2 is an end view showing an internal configuration of the lens barrel of FIG. 1.

Referring to FIG. 1, lens barrel 10 according to this exemplary embodiment is a lens unit detachable from a camera body (not shown). Referring to FIG. 2, lens barrel 10 includes six lens frames (first group lens frame unit 11 to fifth group lens frame unit 15 and lens frame 16) holding an optical system including ten lenses L1 to L10 in optical axis X direction, cam frame 17, fixing frame 18, and aperture unit 19.

Ten lenses L1 to L10 are disposed in this order from a subject side in an optical axis direction as shown in FIG. 2, and guide a subject image to an image sensor (not shown) mounted on the camera body.

(First Group Lens Frame Unit 11)

Referring to FIG. 2, first group lens frame unit (first lens frame) 11 is a lens frame disposed nearest to the subject side and includes three lenses (first lenses) L1 to L3. First group lens frame unit 11 has body 11a, lens holding part 11b, insertion holes 11c, and openings 11d. First group lens frame unit 11 is moved back and forth integrally with lens frame 16 in optical axis X direction by operating and driving an actuator or a manual ring member (not shown).

Body 11a is a cylindrical member. Inner circumferential surface 11aa of cylindrical body 11a includes lens holding part 11b, which holds three lenses L1 to L3, at an end on the subject side in the optical axis direction. Body 11a includes claws 11e on an inner circumferential surface thereof to hold lens frame 16 (described below) with the phase being adjusted.

Inner circumferential surface 11aa includes depression (adhesive reservoir) 11ab at a position facing a depression (adhesive reservoir) 16ca disposed on an outer peripheral surface of lens frame 16 (described below).

Figure 7:
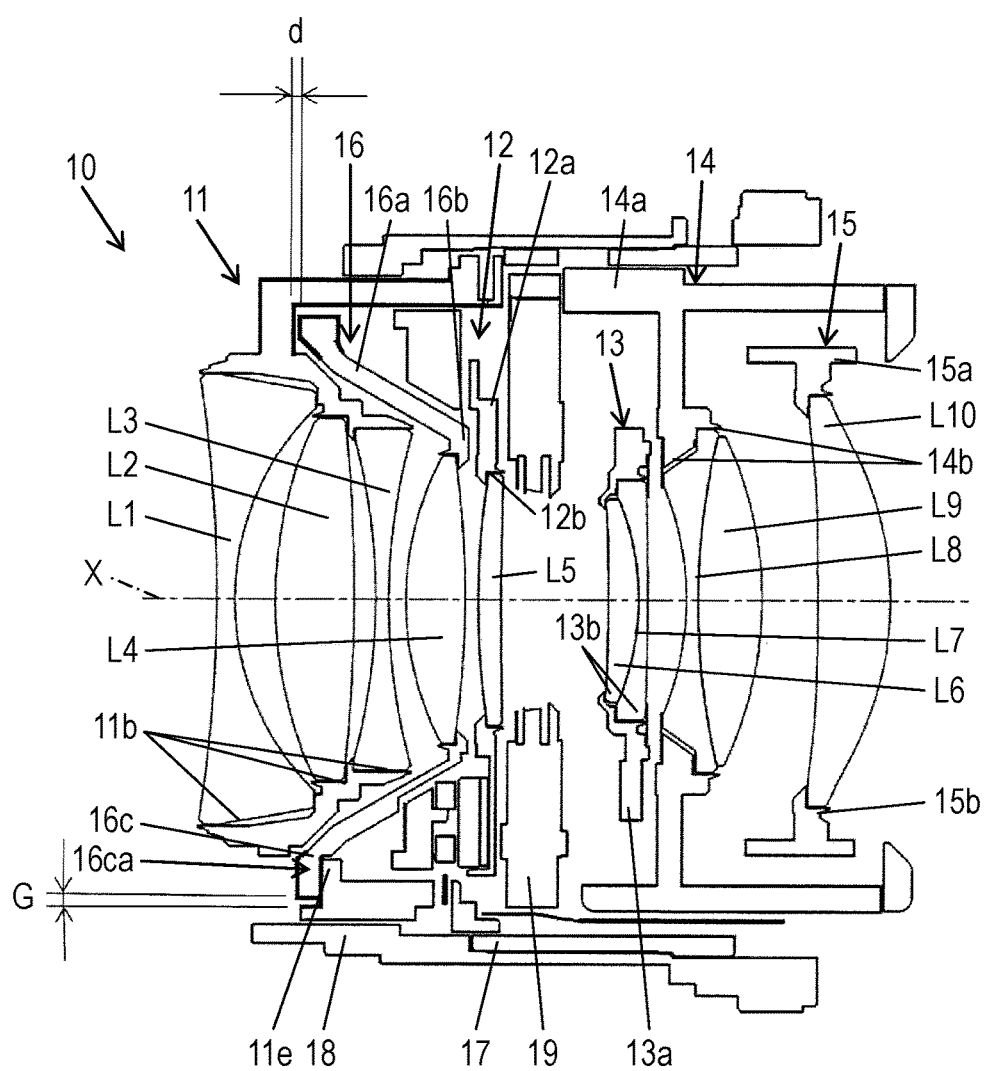
FIG. 7 is an end view illustrating an internal configuration of the lens barrel of FIG. 1.

Predetermined radial clearance G is provided, as shown in FIGS. 2 and 7, between inner circumferential surface 11aa and outer peripheral protrusion 16c of lens frame 16 disposed to face inner circumferential surface 11aa.

With this configuration, lens frame 16 is held on the side of inner circumferential surface 11aa of body 11a of first group lens frame unit 11 in a radially movable manner. Accordingly, radial clearance G enables eccentricity adjustment of lens L4 included in lens frame 16 with respect to lens group (lenses L1 to L3) included in first group lens frame unit 11 (described below).

Depression 11ab is joined with depression (adhesive reservoir) 16ca provided on the outer peripheral surface of lens frame 16 (described below) to form a space to be filled with adhesive 21 (see FIG. 6).

Lens holding part 11b holds three lenses L1 to L3 in this order on the inner circumferential surface at an end of body 11a on the subject side.

Insertion hole 11c is a through hole penetrating from the outer peripheral surface to the inner circumferential surface of body 11a, and three insertion holes 11c are provided at substantially equal angular intervals (about 120 degrees). Jigs 20 for eccentricity adjustment described in the following passages (see FIG. 6) are inserted in insertion holes 11c, respectively.

Since the plurality of insertion holes 11c are provided, eccentricity adjustment can be performed with high accuracy. In particular, three or more insertion holes 11c are provided, thereby further enhancing the accuracy of eccentricity adjustment in a plurality of directions orthogonal to optical axis X.

In lens barrel 10 according to this exemplary embodiment, insertion holes 11c are exposed outside in a state where all of the lens frames (first group lens frame unit 11 to fifth group lens frame unit 15 and lens frame 16) shown in FIG. 2 are assembled.

Figure 3:
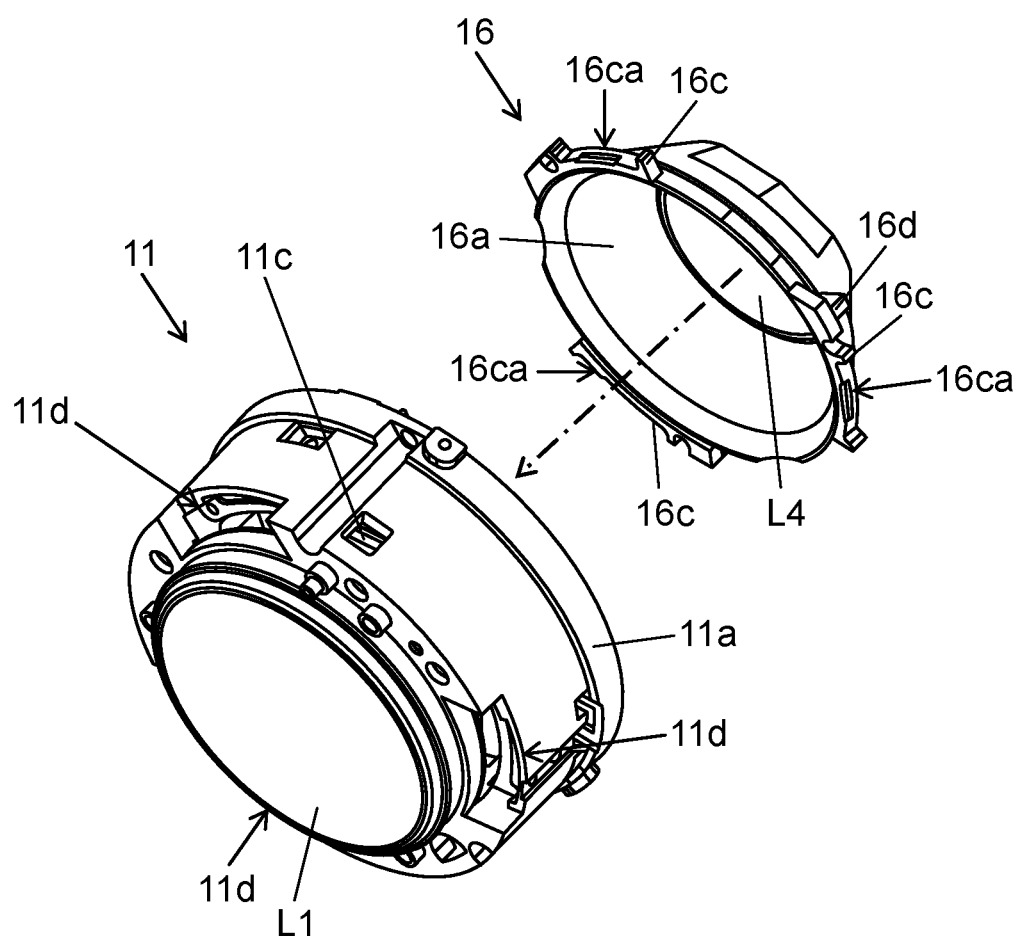
FIG. 3 is an exploded perspective view illustrating a step of mounting a lens frame on an inner circumference side of a first group lens frame unit included in the lens barrel of FIGS. 1 and 2.

Referring to FIGS. 2 and 3, three openings 11d are provided on a surface of cylindrical body 11a perpendicular to optical axis X at substantially equal angular intervals (about 120 degrees). Each of openings 11d exposes depressions 11ab, 16ca, to which adhesive 21 is applied, from the subject side of cylindrical body 11a in a state where all of the lens frames (first group lens frame unit 11 to fifth group lens frame unit 15 and lens frame 16) shown in FIG. 2 are assembled.

Figure 4C:
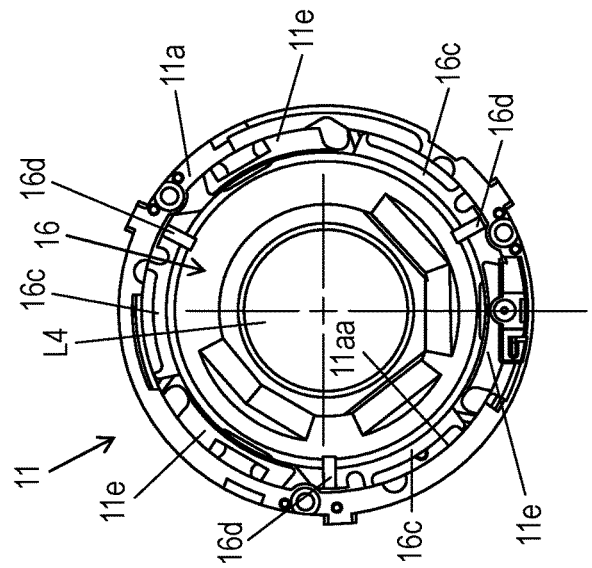
FIG. 4C illustrates the first group lens frame unit of FIG. 3 as viewed from a camera body side.
Figure 4B:
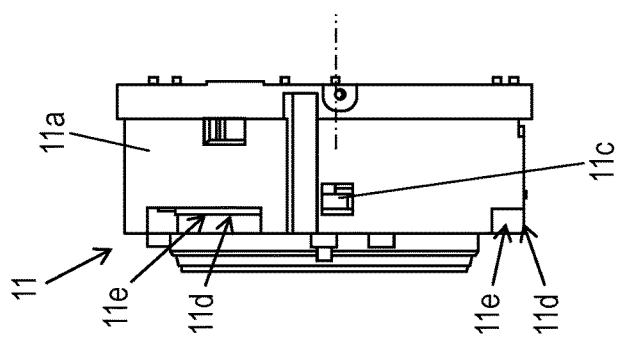
FIG. 4B is a side view of the first group lens frame unit of FIG. 3.
Figure 4A:
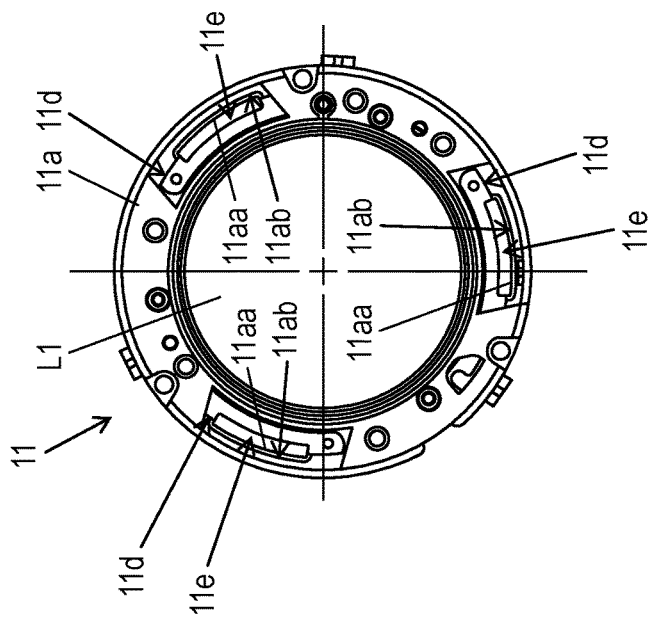
FIG. 4A illustrates the first group lens frame unit of FIG. 3 as viewed from a subject side.

Referring to FIGS. 4A and 4C, three claws 11e are provided on the subject side of inner circumferential surface 11aa of body 11a at substantially equal angular intervals (about 120 degrees). Each of claws 11e projects radially inwardly from inner circumferential surface 11aa. Claws 11e are engaged with outer peripheral protrusions 16c of lens frame 16 (described below). With this configuration, lens frame 16 is locked on inner circumferential surface 11aa of body 11a of first group lens frame unit 11.

Eccentricity adjustment of lens L4 included in lens frame 16 with respect to the lens group (lenses L1 to L3) included in first group lens frame unit 11 is detailed below.

(Second Group Lens Frame Unit 12)

Referring to FIG. 2, second group lens frame unit (second lens frame) 12 is disposed on inner circumferential surface 11aa side of body 11a of first group lens frame unit 11 in such a manner that lens frame 16 is sandwiched between first group lens frame unit 11 and second group lens frame unit (second lens frame) 12 in optical axis X direction. Second group lens frame unit 12 as shown in FIG. 2, includes body 12a, lens holding part 12b, and lens L5.

Body 12a is a substantially disc-shaped member, and includes lens holding part 12b around a center opening thereof.

Lens holding part 12b has a substantially circular opening and holds lens (second lens) L5 therein.

Referring to FIG. 2, lens L5 has a convex shape on the subject side, and is disposed downstream of lens L4 included in lens frame 16 as viewed from the subject side in optical axis X direction.

(Third Group Lens Frame Unit 13)

Referring to FIG. 2, third group lens frame unit 13 is disposed on an inner circumference side of body 14a of cylindrical fourth group lens frame unit 14 in a movable manner in optical axis X direction. Third group lens frame unit 13 includes body 13a, lens holding part 13b, and lenses L6, L7. Third group lens frame unit 13 is moved back and forth in optical axis X direction by operating the actuator (not shown).

Body 13a is a substantially disc-shaped member and is disposed downstream of aperture unit 19 as viewed from the subject side in optical axis X direction (see FIG. 2). Body 13a includes lens holding part 13b around a center opening thereof.

Lens holding part 13b has a substantially circular opening and holds lenses L6, L7 therein.

Lens L6 has a convex shape on the camera body (not shown) side, and is disposed downstream of aperture unit 19 as viewed from the subject side in optical axis X direction.

Lens L7 has a concave shape to mate with the convex shape of lens L6, and is fixed to lens holding part 13b in contact with L6.

(Fourth Group Lens Frame Unit 14)

Fourth group lens frame unit (second lens frame) 14 has a substantially cylindrical shape, and is disposed downstream of third group lens frame unit 13 as viewed from the subject side in optical axis X direction (see FIG. 2). Fourth group lens frame unit 14 includes body 14a, lens holding part 14b, and lenses (second lenses) L8, L9.

Body 14a is a cylindrical member. Lens holding part 14b to hold two lenses L8, L9 is provided on the inner circumference side of cylindrical body 14a.

Lens holding part 14b holds two lenses L8, L9 in this order at a position a little closer to the subject on the inner circumferential surface of body 14a.

Lens L8 is concave on both of the subject side and the camera body side.

Lens L9 is disposed downstream of lens L8, and has a convex shape to mate with the concave shape of lens L8.

(Fifth Group Lens Frame Unit 15)

Referring to FIG. 2, fifth group lens frame unit 15 is disposed on the inner circumference side of body 14a of cylindrical fourth group lens frame unit 14 in a movable manner in optical axis X direction. Fifth group lens frame unit 15 includes body 15a, lens holding part 15b, and lens L10. Fifth group lens frame unit 15 is moved back and forth in optical axis X direction by operating the actuator (not shown).

Body 15a is a substantially disc-shaped member and is disposed downstream of lens L9 included in fourth group lens frame unit 14 as viewed from the subject side in optical axis X direction (see FIG. 2). Body 15a includes lens holding part 15b around a center opening thereof.

Lens holding part 15b has a substantially circular opening and holds lens L10 therein.

Lens L10 has a convex shape on the camera body (not shown) side, and is disposed downstream of lens L9 as viewed from the subject side in optical axis X direction. Lens L10 is disposed most downstream side (camera body side) in the optical system included in lens barrel 10 as viewed in optical axis X direction.

(Lens Frame 16)

Referring to FIG. 2, lens frame (third lens frame) 16 is disposed on inner circumferential surface 11aa side of body 11a of first group lens frame unit 11 so as to be sandwiched between the lens group included in first group lens frame unit 11 and second group lens frame unit 12 in optical axis X direction. Lens frame 16 includes body 16a, lens holding part 16b, outer peripheral protrusion 16c, depression (adhesive reservoir) 16ca, stopper 16d, and lens L4 (see FIG. 2).

Referring to FIG. 2, body 16a has a generally conical tubular shape having a generally trapezoidal shape in a sectional view, and includes lens holding part 16b around a center opening thereof. Outer peripheral protrusion 16c projecting radially outwardly is provided at an outermost part of the outer peripheral surface of body 16a.

Lens holding part 16b has a substantially circular opening and holds lens (third lens) L4 therein. Referring to FIGS. 2 and 3, lens holding part 16b is fixed to first group lens frame unit 11 so as to be positioned on the camera body side in optical axis X direction in a state where lens barrel 10 is assembled.

Lens L4 has a convex shape on the subject side as shown in FIG. 2. Lens L4 is disposed downstream of lens L3 included in first group lens frame unit 11 as viewed from the subject side in optical axis X direction.

According to this exemplary embodiment, lens L4 has a high optical sensitivity, and requires further accuracy in the eccentricity adjustment.

Referring to FIG. 3, three outer peripheral protrusions 16c, each of which is a flange-shaped member, are provided on the outer peripheral surface of body 16a on the subject side in optical axis X direction at substantially equal angular intervals (about 120 degrees). Depression 16ca depressed radially inwardly is provided at a substantially central part of each of outer peripheral protrusion 16c.

Depression (adhesive reservoir) 16ca is disposed to face depression 11ab provided on inner circumferential surface 11aa of body 11a of the above described first group lens frame unit 11 in a state where lens barrel 10 shown in FIG. 2 is assembled. A space (adhesive reservoir) to which an adhesive is applied is provided between depression 16ca and depression 11ab of first group lens frame unit 11.

Stopper 16d projects from a surface of outer peripheral protrusion 16c perpendicular to optical axis X toward the camera body, and reinforces the strength of outer peripheral protrusion 16c. When lens frame 16 is fixed to the inner circumference side of first group lens frame unit 11, stopper 16d positions lens frame 16 at the time of rotating on the inner circumference side of first group lens frame unit 11 (see FIGS. 4A to 5C).

More specifically, to assemble lens barrel 10 according to this exemplary embodiment, lens frame 16 including lens L4 is firstly fixed to the inner circumference side of first group lens frame unit 11 (see FIG. 3).

At this time, lens frame 16 is made contact with an innermost part of first group lens frame unit 11 as an initial state to secure lens frame 16 on the inner circumference side of first group lens frame unit 11 (see FIGS. 4A to 4C).

In the state shown in FIGS. 4A to 4C, each of three outer peripheral protrusions 16c on the outer peripheral surface of lens frame 16 is inserted between two of three claws 11e on first group lens frame unit 11 as viewed from the camera body side in optical axis X direction as shown in FIG. 4C.

Figure 5A:
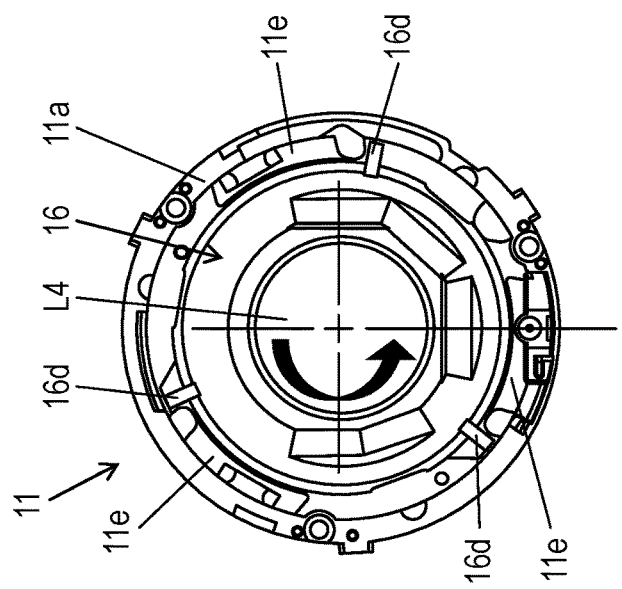
FIG. 5A illustrates the first group lens frame unit of FIG. 3 as viewed from the subject side.
Figure 5B:
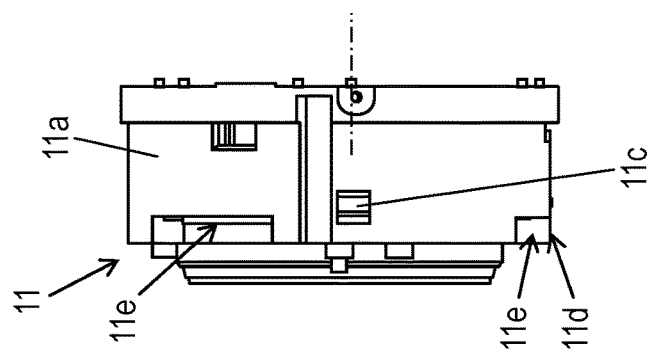
FIG. 5B is a side view of the first group lens frame unit of FIG. 3.
Figure 5C:
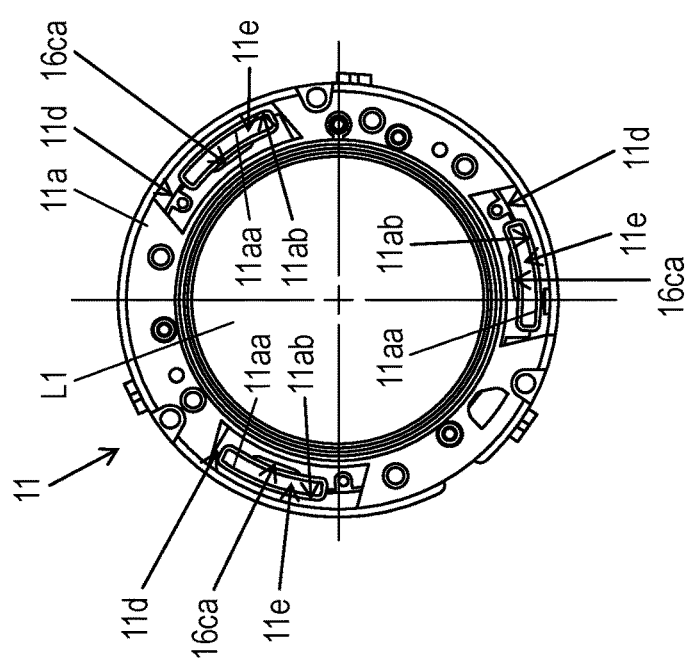
FIG. 5C illustrates a step of rotating the lens frame on the inner circumference side of the first group lens frame unit of FIG. 3 as viewed from the camera body side.

Then, as shown in FIG. 5C, lens frame 16 is rotated counterclockwise around optical axis X with respect to first group lens frame unit 11 as viewed from the camera body side in optical axis X direction.

This allows three outer peripheral protrusions 16c inserted among three claws 11e to enter the subject side of claws 11e provided on first group lens frame unit 11 as viewed from the camera body side in optical axis X direction.

Accordingly, three outer peripheral protrusions 16c are respectively locked by three claws 11e, thereby limiting a movement of lens frame 16 with respect to first group lens frame unit 11 in optical axis X direction.

Three stoppers 16d provided on above-described lens frame 16 respectively come into contact with the side surfaces of claws 11e to limit the counterclockwise rotation of lens frame 16 on the inner circumference side of first group lens frame unit 11.

With this configuration, lens frame 16 is locked on the inner circumference side of first group lens frame unit 11 so as not to fall in optical axis X direction.

At this time, lens frame 16 is in a provisionally fixed state on the inner circumference side of first group lens frame unit 11.

In other words, movement of lens frame 16 with respect to first group lens frame unit 11 in optical axis X direction is limited through predetermined clearance d, since the engagement of claws 11e and outer peripheral protrusions 16c as described above.

Referring to FIG. 7, predetermined radial clearance G is provided between each of outer peripheral protrusions 16c of lens frame 16 and inner circumferential surface 11aa of first group lens frame unit 11. Accordingly, movement of lens frame 16 with respect to first group lens frame unit 11 in a radial direction is not limited.

In the provisionally fixed state, the eccentricity of lens L4 included in lens frame 16 is adjusted by moving lens frame 16 in a radial direction while taking into consideration of the balance of all lenses L1 to L10 as a whole. In this manner, the eccentricity adjustment of lens L4 having a high optical sensitivity can be performed after assembling lens barrel 10 in view of the overall balance of L1 to L10, thereby enhancing the accuracy of optical axis adjustment of the lens barrel.

(Other Configuration)

Referring to FIG. 2, cam frame 17 is a cylindrical member and is disposed on the outer peripheral surface side of fourth group lens frame unit 14. Cam frame 17 includes a cam groove (not shown) to be engaged with a cam pin (not shown) provided on the outer peripheral surface of fourth group lens frame unit 14.

With this configuration, a rotation-driving power from a rotation-driving source (not shown) causes the cam pin to move along the cam groove, thereby allowing first group lens frame unit 11 to fifth group lens frame unit 15 and lens frame 16 to move back and forth in the optical axis direction. Accordingly, distances among lenses L1 to L10 included in first group lens frame unit 11 to fifth group lens frame unit 15 and lens frame 16 are adjusted, thereby enabling zoom photography, macro photography, and the like.

Referring to FIG. 2, fixing frame 18 is a cylindrical member disposed on the outer peripheral side of first group lens frame unit 11 and fourth group lens frame unit 14 to cover the outer peripheral surfaces of first group lens frame unit 11 to fourth group lens frame unit 14. Insertion hole 18a, which is similar to insertion hole 11c of first group lens frame unit 11, is provided on fixing frame 18 at a position corresponding to insertion hole 11c.

Insertion hole 18a is a through hole penetrating from an outer peripheral surface to an inner circumferential surface of fixing frame 18, and three insertion holes 18a are provided at substantially equal angular intervals (about 120 degrees) in the same manner as insertion holes 11c. Jig 20 (see FIG. 6) for eccentricity adjustment (described below) is inserted to each of insertion hole 18a.

Aperture unit 19 includes a plurality of aperture blades driven by a driving source such as a stepping motor or the like (not shown). Aperture unit 19 opens/closes the plurality of aperture blades to change an area of an aperture, thereby changing an aperture value of the optical system of lens barrel 10 (lenses L1 to L10).

<Eccentricity Adjustment of Lens Frame 16 Included in Lens Barrel 10>

According to lens barrel 10 of this exemplary embodiment, eccentricity adjustment (optical axis adjustment) of lens frame 16 disposed between a plurality of lens frames is performed as described below.

Figure 6:
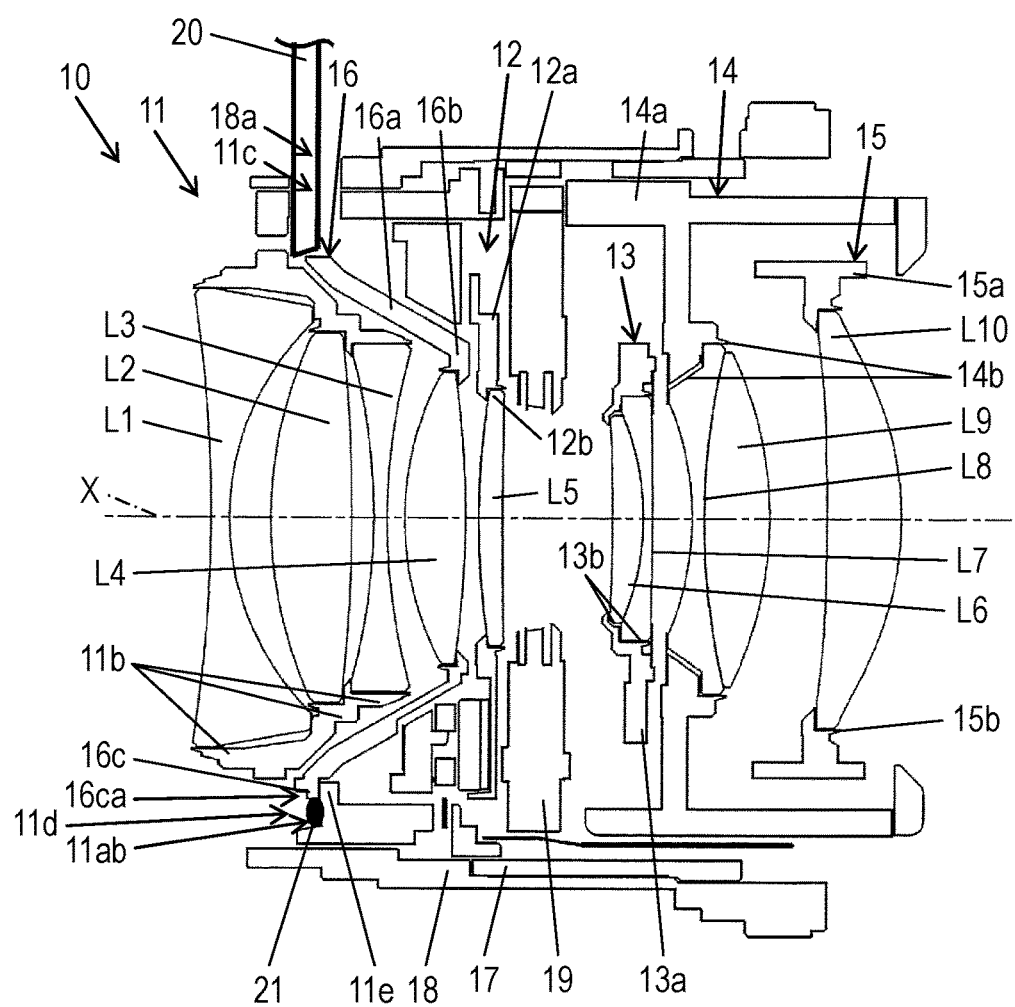
FIG. 6 illustrates a state in which a jig for eccentricity adjustment is inserted from an outside of the lens barrel of FIGS. 1 and 2 in an assembled state.

A position of the optical axis of lens frame 16 is adjusted with jig 20 for eccentricity adjustment shown in FIG. 6 in the provisional fixed state in which lens frame 16 is immovable in optical axis X direction and movable in a radial direction at the inner circumference side of first group lens frame unit 11 as shown in FIGS. 5A to 5C.

Specifically, jigs 20 for eccentricity adjustment are respectively inserted to three positions through three insertion holes 11c and three insertion holes 18a provided on the outer peripheral surface of lens barrel 10 at substantially equal angular intervals (about 120 degrees).

Insertion holes 11c, 18a are provided to communicate with the outside as described above to allow access to a part of outer peripheral side of lens frame 16 from the outside.

With this configuration, a radial position of lens frame 16 in the provisionally fixed state on the inner circumference side of first group lens frame unit 11 can be adjusted with tip ends of three jigs 20 respectively inserted in insertion holes 11c, 18a disposed at substantially equal angular intervals.

This makes it possible to align the optical axes of three lenses L1 to L3 included in first group lens frame unit 11 and the optical axis of lens L4 included in lens frame 16.

In a state where the eccentricity is adjusted with three jigs 20, adhesive 21 is then introduced from the subject side in optical axis X direction to fill the above described space formed by depression 11ab of first group lens frame unit 11 and depression 16ca on lens frame 16 as shown in FIG. 6.

A UV (ultraviolet)-curing resin is used as adhesive 21.

Ultraviolet rays are emitted from the subject side in optical axis X direction to cure the adhesive in a state where the eccentricity is adjusted with three jigs 20.

The step of filling the space formed by depression 11ab of first group lens frame unit 11 and depression 16ca on lens frame 16 with adhesive 21 and irradiating the space with ultraviolet rays may be performed one by one for three spaces disposed at substantially equal angular intervals. Alternatively, after filling all of the three spaces with adhesive 21, the three spaces may be irradiated with ultraviolet rays at one time to cure the adhesive.

Other Exemplary Embodiments

One exemplary embodiment of the present disclosure has been described above, but the present disclosure is not limited thereto, and various modifications may be made without departing from the scope of the present disclosure.

(A)

The above exemplary embodiment describes an example in which an adhesive reservoir (depressions 11ab, 16ca) is employed as a joint to fix first group lens frame unit (first lens frame) 11 and lens frame (third lens frame) 16 to each other. However, the present disclosure is not limited thereto.

Other than the fixing with an adhesive, screw fastening, crimping, or the like may be employed, for example.

Alternatively, both of an adhesive and screw fastening, crimping, or the like may be employed.

(B)

The above exemplary embodiment describes an example in which a lens barrel includes first group lens frame unit 11 to fifth group lens frame unit 15 including five lens groups disposed in an optical axis direction and lens frame 16 including lens L4. However, the present disclosure is not limited thereto.

It is only required that the lens barrel according to the present disclosure includes at least three lens frames. In the case where the lens barrel includes five lens frames for example, the configuration of the present disclosure may be applied to eccentricity adjustment of inner lens frames between the lens frames on both the sides in the optical axis direction.

(C)

The above exemplary embodiment describes an example in which a space formed by depression 11ab provided on inner circumferential surface 11aa of body 11a of first group lens frame unit 11 and depression 16ca provided on outer peripheral protrusion 16c projecting radially outwardly from the outer peripheral surface of body 16a of lens frame 16 is used as an adhesive reservoir. However, the present disclosure is not limited thereto.

For example, either one of the depressions provided on inner circumferential surface 11aa of first group lens frame unit 11 and on the outer peripheral surface of lens frame 16 may be used as an adhesive reservoir.

In other words, a depression used as an adhesive reservoir is not necessarily provided on both of inner circumferential surface 11aa of first group lens frame unit 11 and the outer peripheral surface of lens frame 16.

(D)

The above exemplary embodiment describes an example in which three claws 11e are provided on the inner circumferential surface of body 11a of first group lens frame unit 11 and three outer peripheral protrusions 16c are provided on the outer peripheral part of lens frame 16 to fix lens frame 16 on first group lens frame unit 11. However, the present invention is not limited thereto.

For example, a number of a pair of claw 11e on the first group lens frame unit and outer peripheral protrusion 16c on lens frame 16 is not limited to three, and may be two or may be four or more.

(E)

The above exemplary embodiment describes an example in which first lens frame 11 is disposed on a subject side. However, first lens frame 11 may be disposed on a side opposite to the subject according to the present invention.

(F)

The above exemplary embodiment describes an example in which opening 11d and depressions 11ab and 16ca that serve as a joint are exposed on the subject side. However, opening 11d and depressions 11ab and 16ca that serve as a joint may be exposed on a side opposite to the subject or on the outer peripheral side of first lens frame 11.

INDUSTRIAL APPLICABILITY

A lens barrel and a method for optical axis adjustment according to the present disclosure have the effect of facilitating eccentricity adjustment of a lens attached to an inner lens frame among a plurality of lens frames disposed in an optical axis direction in a lens barrel, and therefore can be widely applied to various lens barrels.

REFERENCE MARKS IN THE DRAWINGS

10: lens barrel
11: first group lens frame unit (first lens frame)
11a: body
11aa: inner circumferential surface
11ab: depression (adhesive reservoir)
11b: lens holding part
11c: insertion hole
11d: opening
11e: claw
12: second group lens frame unit (second lens frame)
12a: body
12b: lens holding part
13: third group lens frame unit
13a: body
13b: lens holding part
14: fourth group lens frame unit (second lens frame)
14a: body
14b: lens holding part
15: fifth group lens frame unit
15a: body
15b: lens holding part
16: lens frame (third lens frame)
16a: body
16b: lens holding part
16c: outer peripheral protrusion
16ca: depression (adhesive reservoir)
16d: stopper
17: cam frame
18: fixing frame
18a: insertion hole
19: aperture unit
20: jig (jig for eccentricity adjustment)
21: adhesive
L1 to L3: lens (first lens)
L4: lens (third lens)
L5: lens (second lens)
L8, L9: lens (second lens)
L6, L7, L10: lens
d: clearance
G: radial clearance
X: optical axis

The invention claimed is:

1. A lens barrel comprising:
a first lens, a second lens, and a third lens disposed in an optical axis direction;
a first lens frame having a cylindrical shape and holding the first lens;
a second lens frame holding the second lens; and
a third lens frame disposed on an inner circumference side of the first lens frame through a radial clearance and between the first lens frame and the second lens frame and holding the third lens,
wherein
an outer peripheral surface of the first lens frame includes at least one insertion hole for inserting a jig for eccentricity adjustment of the third lens frame,
in a provisionally fixed state of the first lens frame and the third lens frame, the third lens frame is substantially fixed in the axial direction relative to the first lens frame, and the third lens frame is movable in a radial direction with respect to the first lens frame, and
at least one of the first lens frame and the third lens frame includes a joint to fix the third lens frame to the first lens frame at a position accessible from an outside of the first lens frame in a state where the first to third lens frames are assembled.

2. The lens barrel according to claim 1, wherein
the joint is an adhesive reservoir configured to be filled with an adhesive for fixing the third lens frame that has been subjected to eccentricity adjustment to the first lens frame.

3. The lens barrel according to claim 2, wherein
the adhesive reservoir includes a depression provided on an outer peripheral part of the third lens frame at a position facing an inner circumferential surface of the first lens frame.

4. The lens barrel according to claim 2, wherein
the adhesive reservoir includes a depression provided on an inner circumferential part of the first lens frame at a position facing an outer peripheral part of the third lens frame.

5. The lens barrel according to claim 1, wherein
the at least one insertion hole includes three insertion holes provided on the outer peripheral surface of the first lens frame at substantially equal angular intervals.

6. The lens barrel according to claim 1, wherein
the joint is exposed to the outside of the first lens frame.

7. The lens barrel according to claim 6, wherein
the first lens frame includes an opening to expose the joint to the outside of the first lens frame.

8. The lens barrel according to claim 1, wherein
a protrusion projecting radially outwardly is provided on the third lens frame, the third lens frame is disposed in the movable manner in the radial direction with respect to the first lens frame by an engagement of the protrusion of the third lens frame and the first lens frame.

9. The lens barrel according to claim 1, wherein
when in the provisionally fixed state, the third lens frame is movable in the radial direction relative to the second lens frame.

10. The lens barrel according to claim 1, wherein
when in the provisionally fixed state, the third lens frame is movable relative to the first lens frame along a plane which is perpendicular to the optical axis.

11. A method for optical axis adjustment of a lens barrel including:
a first lens, a second lens, and a third lens disposed in an optical axis direction;
a first lens frame having a cylindrical shape and holding the first lens;
a second lens frame holding the second lens; and
a third lens frame holding the third lens,
the method comprising the steps of:
assembling the first to third lens frames in such a manner that the third lens frame is movable in a radial direction with respect to the first lens frame and that the third lens frame is disposed on an inner circumference side of the first lens frame through a radial clearance and between the first lens frame and the second lens frame;
inserting a jig from at least one insertion hole provided on an outer peripheral surface of the first lens frame after the assembling step to perform eccentricity adjustment of the third lens frame by moving the third lens frame in the radial direction; and
after performing the eccentricity adjustment, fixing the third lens frame to the first lens frame with a joint that is provided on at least one of the first lens frame and the third lens frame and is accessible from an outside of the first lens frame in a state where the first to third lens frames are assembled.

12. The method for optical axis adjustment of a lens barrel according to claim 11, wherein
a protrusion projecting radially outwardly is provided on the third lens frame of the lens barrel, and
in the assembling, the first to third lens frames are assembled such that the third lens frame is disposed in the movable manner in the radial direction with respect to the first lens frame by an engagement of the protrusion of the third lens frame and the first lens frame.

* * * * *